United States Patent [19]

Dettling et al.

[11] Patent Number: 4,693,078
[45] Date of Patent: Sep. 15, 1987

[54] SOOT AFTERBURNER FOR MOTOR-VEHICLE EXHAUST SYSTEM

[75] Inventors: Hubert Dettling, Waiblingen; Gottlob Haag, Markgröningen; Karl-Heinz Hägele, Vaihingen/Enz; Rolf Leonhard, Schwieberdingen; Wilhelm Polach, Möglingen, all of Fed. Rep. of Germany

[73] Assignee: Robert Bosch GmbH, Stuttgart, Fed. Rep. of Germany

[21] Appl. No.: 807,435

[22] Filed: Dec. 9, 1985

[30] Foreign Application Priority Data

Feb. 8, 1985 [DE] Fed. Rep. of Germany ....... 3504299

[51] Int. Cl.⁴ ............................ F01N 3/22; F01N 3/26
[52] U.S. Cl. ......................................... 60/295; 60/297; 60/298; 60/303; 422/169; 422/174; 422/175
[58] Field of Search ................. 60/297, 295, 303, 298; 55/DIG. 30; 422/174, 175, 169

[56] References Cited

U.S. PATENT DOCUMENTS

| | | | |
|---|---|---|---|
| 3,013,628 | 12/1961 | Jacobs | 60/297 |
| 3,197,955 | 8/1965 | Cohn | 60/295 |
| 3,253,400 | 5/1966 | Hass | 60/297 |
| 3,805,523 | 4/1974 | Tanasawa | 60/298 |
| 4,164,847 | 8/1979 | Johansen | 60/298 |
| 4,406,119 | 9/1983 | Kamiya | 60/297 |

FOREIGN PATENT DOCUMENTS

| | | | |
|---|---|---|---|
| 725,371 | 1/1966 | Canada | 60/295 |
| 0152623 | 8/1985 | European Pat. Off. . | |
| 58111 | 4/1984 | Japan | 60/311 |

*Primary Examiner*—Douglas Hart
*Attorney, Agent, or Firm*—Michael J. Striker

[57] ABSTRACT

An afterburner for clearing soot from a particle-laden gas stream has a housing centered on an upright axis and having a generally cylindrical upper portion having a downwardly open lower end, and a lower portion tapering toward the axis from the lower end of the upper portion and having at the axis a downwardly closed lower end. An exhaust tube opens at the axis into the upper housing portion above the lower end thereof. A feed tube opening tangentially into the upper housing portion above the lower end thereof introduces the particle-laden gas stream tangentially into the upper housing portion. Thus the soot particles of the gas stream move inertially radially outward and descend in the housing to collect at the lower end of the lower housing portion. An electrical heating element at the axis at the lower end of the lower housing portion burns the soot particles collecting therein.

10 Claims, 2 Drawing Figures

SOOT AFTERBURNER FOR MOTOR-VEHICLE EXHAUST SYSTEM

FIELD OF THE INVENTION

The present invention relates to a soot afterburner for a motor-vehicle exhaust system. More particularly this invention concerns an electrically powered device that burns soot separated out of the exhaust-gas stream of, for instance, a diesel engine.

BACKGROUND OF THE INVENTION

A soot-producing engine is typically provided with electrostatic and cyclone-type separators that divide the soot-carrying exhaust gas of the engine into a particle-free stream and a particle-laden stream. The latter stream is fed to an afterburner that thermally and catalytically converts the soot mainly to harmless gas.

A typical such system as described in European patent document 0,152,623 has a housing forming a combustion chamber provided at one end with a feed tube coming from the exhaust-gas separators and feeding this combustion chamber with a particle-laden gas stream. The opposite end of the combustion chamber has an electrical heating element of large surface area. A filter is provided on the other side of this heating element and a vent tube opens into the top of the compartment on the other side of this filter. Combustion gas, normally air, is mixed with the incoming particle-laden gas stream in an annular area around the mouth of the feed pipe.

Such an arrangement is fairly bulky and, therefore, requires a large electrical heating element that consumes considerable electricity. In general operational efficiency is therefore relatively low.

OBJECTS OF THE INVENTION

It is therefore an object of the present invention to provide an improved soot afterburner for a motor-vehicle exhaust system.

Another object is the provision of such a soot afterburner for a motor-vehicle exhaust system which overcomes the above-given disadvantages, that is which is relatively small and efficient and that consumes minimal electrical energy.

SUMMARY OF THE INVENTION

An afterburner for clearing soot from a particle-laden gas stream according to the invention has a housing centered on an upright axis and having a generally cylindrical upper portion having a downwardly open lower end, and a lower portion tapering toward the axis from the lower end of the upper portion and having at the axis a downwardly closed lower end. An exhaust tube opens at the axis into the upper housing portion above the lower end thereof. A feed tube opening tangentially into the upper housing portion above the lower end thereof introduces the particle-laden gas stream tangentially into the upper housing portion. Thus the soot particles of the gas stream move inertially radially outward and descend in the housing to collect at the lower end of the lower housing portion. An electrical heating element at the axis at the lower end of the lower housing portion burns the soot particles collecting therein.

Thus with the system of this invention a relatively small heater can be provided, since the soot particles will be concentrated in the bottom of the normally frustoconical lower portion of the cyclone-type housing. The particles will collect right around the central heating element and burn in a relatively draft-free location for maximum combustion efficiency. Such an arrangement can work without a filter. In addition such an arrangement can work intermittently for low particle concentrations, thereby further sparing operating costs and energy.

According to another feature of this invention there is a horizontal deflector plate fixed in the housing at the axis above the heating element. This structure further deflects the particles radially outward, so that any unburnt particles caught up in the vapor of rising burnt particles will be returned to the bottom of the unit for burning.

The system of this invention further has a plurality of branch conduits having respective inner ends opening tangentially and at axially spaced locations in the upper portion of the housing and each having a respective outer end and a feed manifold connected to the outer conduit ends. A combustion gas is periodically fed under pressure to the feed manifold and is thereby injected tangentially from the inner ends into the upper housing portion. A variable check valve in at least one of the branch conduits passes the combustion gas only when it is at a pressure greater than that in the other conduit. With this system sufficient oxygen can be supplied even when the motor is heavily loaded. As the pressure increases the valves are normally set up to open starting from the top down. Thus the exhaust gas is increasingly displaced with oxygen-containing air toward the bottom of the separation chamber formed by the upper housing portion. The high partial pressure of oxygen facilitates afterburning of the carbon particles by reducing the heat that the heater need supply and generally promoting combustion.

According to a further feature of this invention a heat exchanger is connected to the exhaust tube and the manifold for preheating the combustion gas with the gas exiting the housing via the tube. Such preheating further increases the efficiency of combustion at the heating element. The heat exchanger is formed as a portion of the manifold extending through the tube and exposed to the gases therein for most compact possible construction.

In addition in accordance with the invention the means for periodically feeding combustion gas includes a pressurized source of the combustion gas, a valve connected between the source and the manifold, and a controller connected to the valve for periodically opening same and passing pressurized combustion gas into the manifold. This system allows very fine control of the amount of combustion gas. In addition when the particle concentration is low, it permits the afterburning to be carried out by batches, only when sufficient carbon has collected to support good combustion.

It is also possible according to the invention to mix a catalyst with the combustion gas. This can be done by feeding the catalyst into the combustion gas in the manifold and mixing it there with the combustion gas.

The tube of this invention can have a mouth opening into the upper chamber portion and blocked by a soot-blocking and gas-passing filter. In addition the tube can be formed in the upper portion at least partially of a soot-blocking and gas-passing filter material. Furthermore the exhaust tube has a portion in the upper housing portion that is removable and at least partially formed of a soot-blocking and gas-passing filter material. This arrangement is particularly useful when the gas is fed from the exhaust tube right back into the intake manifold, thereby eliminating nitrous oxide, as no particles of carbon, ash, or the like can be tolerated in this location.

DESCRIPTION OF THE DRAWING

The above and other features and advantages will become more readily apparent from the following, it being understood that any feature described with reference to one embodiment of the invention can be used where possible with the other embodiment. In the accompanying drawing.

SPECIFIC DESCRIPTION

Figure 1:
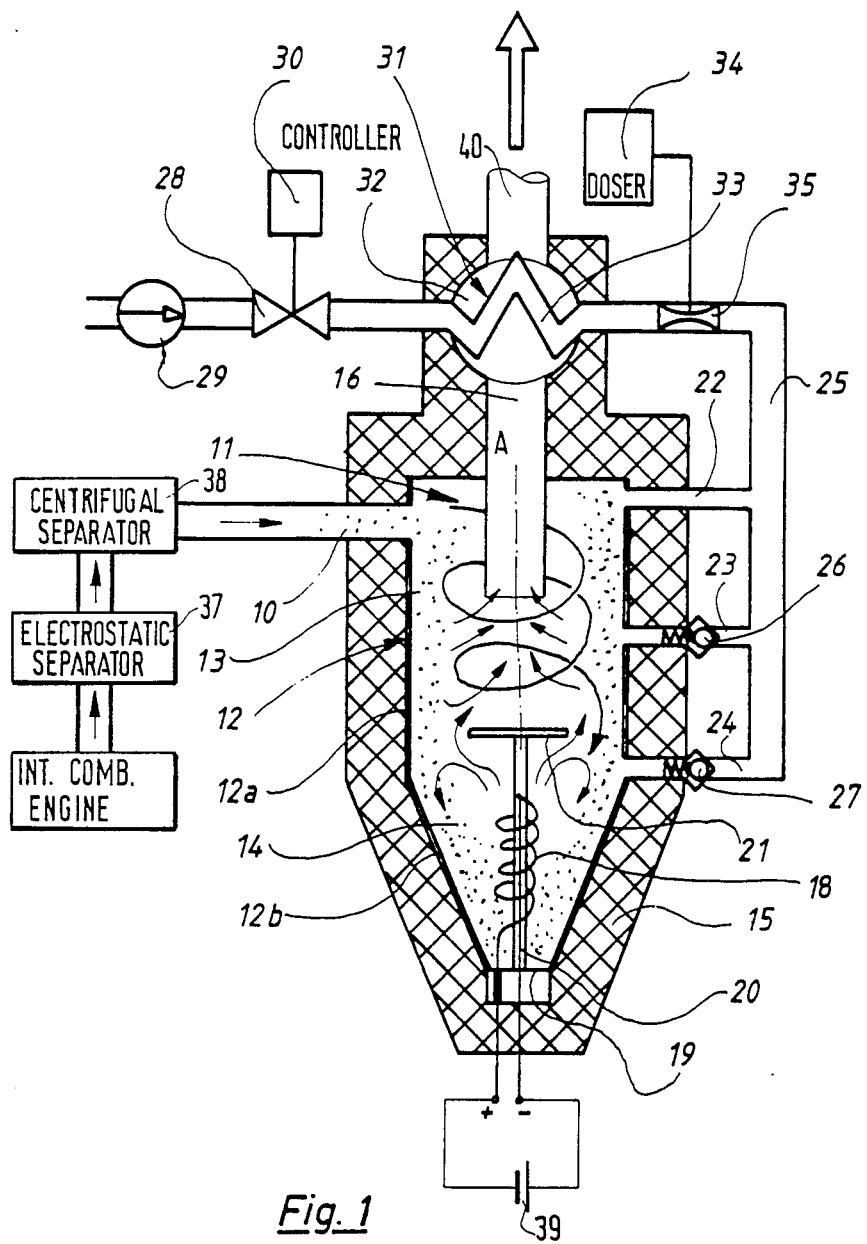
FIG. 1 is a partly diagrammatic view showing the afterburner of this invention in vertical axial section.

As seen in FIG. 1 the system of this invention has an intake or feed tube 10 that receives a gas carrying a large concentration of soot particles from a centrifugal separator 38 in turn receiving a less concentrated such stream from an electrostatic separator 37 in turn receiving the exhaust gases straight from an internal-combustion engine 40. The device comprises a housing 12 centered on a vertical axis A and having a cylindrical upper portion 12a defining an upper chamber 13 and a frusto-conical lower portion 12b defining a downwardly tapering separation chamber 14 having a closed lower end 19. An outlet or exhaust tube 16 extends along the axis A and has a lower end portion in the chamber 13 with a downwardly opening mouth well below the tube 10 which itself opens tangentially into the uppermost regions of this chamber 13. The entire housing is surrounded with a thick layer 15 of thermal insulation.

A rod 20 extending upward along the axis A from the floor 19 supports an electric heating element 18 in the form of a coil of resistive-heating wire energizable from an electric supply 39. Its upper end supports a horizontal deflecting disk 21 at a location slightly above the lower end of the upper chamber 13, this disk 21 having a diameter equal to about half that of the chamber 13.

Thus the gas stream entering the chamber 13 will spin about therein as shown by the arrows 17, inherently descending. The higher inertia of the particles in the gas will cause them to migrate radially outward in standard cyclone fashion so they will concentrate near the inner surfaces of the housing 12 and will migrate downward therein, eventually collecting at the small floor 19 of the chamber 14. Meanwhile the relatively particle-free gas will move down and inward so it can pass up through the large-diameter exhaust tube 16, whence it is vented to the atmosphere or fed back to the intake manifold of the engine 40.

The particles collecting around the element 18 are burnt, so that the elemental carbon of the soot is converted mainly into carbon dioxide. This combustion can upwardly entrain some unburnt particles, but these will be deflected radially outward by the plate 21 so they return to the bottom of the chamber for burning.

In addition according to this invention a source or pump 29 supplies an oxygen-containing combustion supporting gas, here air, through a valve 28 and a heat-exchanger 31 to a manifold 25 that opens via three small-diameter branches 22, 23, and 24 into the chamber 13. The branch 22 opens into the top of the chamber, the branch 23 in its middle just below the mouth of the tube portion 11, and the branch 24 into the bottom of the chamber 13, just at the top of the chamber 14. The branches 23 and 24 are provided with respective check valves 26 and 27 that open to permit flow from the manifold 25 to the chamber 13 at different pressures, the valve 23 opening first. The valve 30 is opened periodically to permit the pressurized air from the pump 29 to be injected into the chamber 13 and mix with the gas therein, increasing the partial pressure of oxygen and the efficiency of the combustion at the element 18. The higher the pressure the more of the branches 22-24 will be open, so that when the engine 40 is running very fast the pressure can be maximized for maximum possible afterburning.

The heat exchanger 31 is formed by a zig-zag portion 33 of the manifold conduit 35 that traverses a spherical widening of the tube 11. Thus the otherwise normally wasted heat of the gases is recaptured to reduce the heat that the element 18 must add to the system.

In addition a doser 34 is provided with injects a catalyst into a venturi 35 in the conduit 25. The catalyst can be cupric or sodium chloride (respectively $CuCl_2$ or $NaCl$). The periodic dosing from the device 34 can correspond to the open cycles of the valve 28 which themselves are determined by a controller 30. The pulsed feeding of gas and catalyst is particularly useful with low soot concentrations, as then a sufficient quantity can be allowed to collect around the heater 18 before same is turned on and the gas and catalyst are fed in for efficient combustion.

Figure 2:
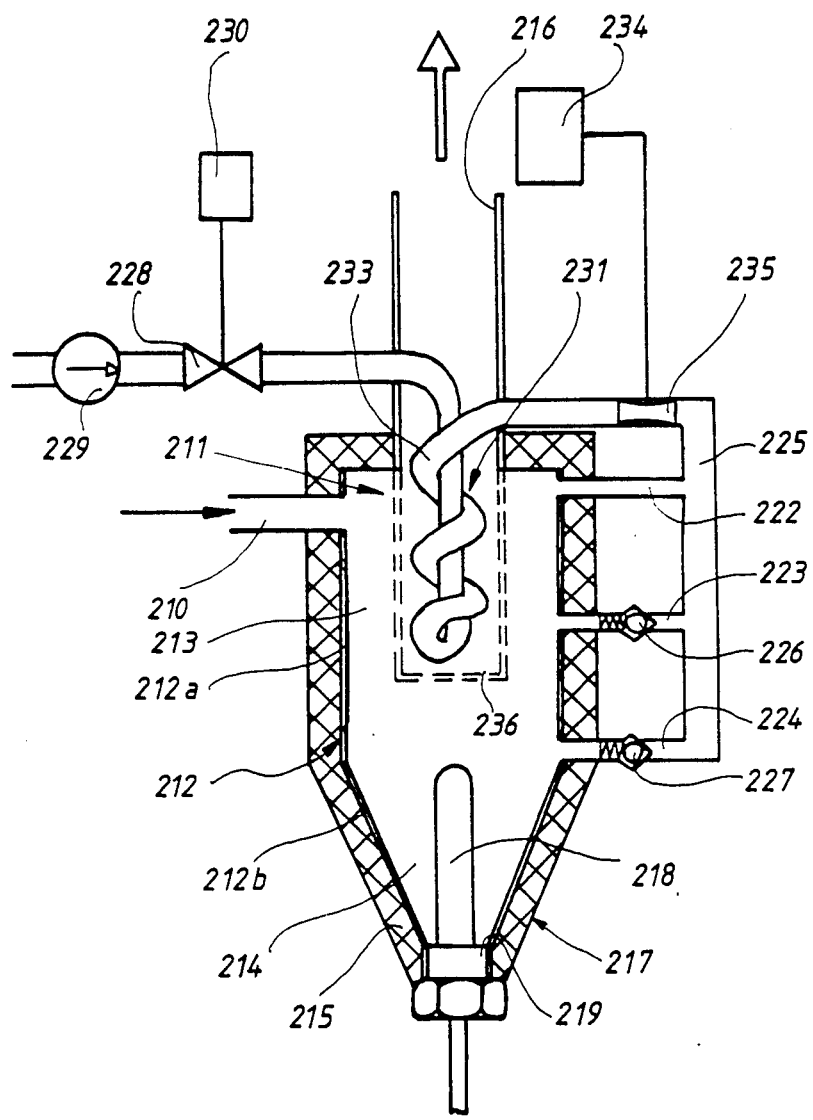
FIG. 2 is a view like FIG. 1 but of another system according to the invention.

The arrangement shown in FIG. 2 corresponds to that of FIG. 1 with functionally identical elements bearing the same reference numerals as in FIG. 1 but increased by 200.

Here the tube 216 has an end portion 211 that is wholly made of a screen-type filter material whose mesh size is sufficient to prevent soot particles from passing but insufficient to block gas. At least the lower end 236 is formed of this material, and the entire portion 211 is removable. Such a filter construction ensures 100% afterburning of the particles.

In addition in this arrangement the portion 233 of the manifold 223 is formed as a straight portion extending from the valve 228 down along the axis in the tube 216 right into the chamber 213, and another portion winding helically up around it. Thus most of the conduit portion 233 lies actually in the chamber 213 for maximum heat-exchange efficiency.

We claim:

1. An afterburner for clearing soot from a particle-laden gas stream, the afterburner comprising:
  a housing centered on an upright axis and having
  a generally cylindrical upper portion having a downwardly open lower end, and
  a lower portion tapering toward the axis from the lower of the upper portion and having at the axis a downwardly closed lower end;
  an exhaust tube opening at the axis into the upper housing portion above the lower end thereof;
  means including a feed tube opening tangentially into the upper housing portion above the lower end thereof for introducing the particle-laden gas stream tangentially into the upper housing portion, whereby the soot particles of the gas stream move inertially radially outward and descend in the housing to collect at the closed lower end of the lower tapering portion;

means including an electrical heating element at the axis the lower end of the lower tapering portion for burning the soot particles collecting therein;

a plurality of branch conduits having respective inner opening tangentially and at axially spaced locations in the upper portion of the housing and each having a respective outer end;

a feed manifold connected to the outer conduit ends;

means for periodically feeding a combustion-supporting gas under pressure to the feed manifold and thereby injecting the combustion-supporting gas tangentially from the inner ends into the upper housing portion; and means including a check valve in at least one of the branch conduits and operated for passing the combustion-supporting gas only when it is at a pressure greater than that in the other conduit.

2. The soot afterburner defined in claim 1, further comprising a horizontal deflector plate fixed in the housing at the axis above the heating element.

3. The soot afterburner defined in claim 1, further comprising means including a heat exchanger connected to the exhaust tube and the manifold for preheating the combustion-supporting gas with the gas exiting the housing via the tube.

4. The soot afterburner defined in claim 1, wherein the means for periodically feeding includes a pressurized source of the combustion gas, a valve connected between the source and the manifold, and control means connected to the valve for periodically opening same and passing pressurized combustion-supporting gas into the manifold.

5. The soot afterburner defined in claim 1, further comprising:

means for mixing a catalyst with the combustion-supporting gas.

6. The soot afterburner defined in claim 5, further comprising:

means for feeding a catalyst into the combustion-supporting gas in the manifold and mixing it with the combustion-supporting gas.

7. The soot afterburner defined in claim 1, wherein the heat exchanger is formed as a portion of the manifold extending through the tube and exposed to the gases therein.

8. The soot afterburner defined in claim 1, wherein the tube has a mouth opening into the upper housing portion and is provided with a soot-blocking and gas-passing filter covering the mouth.

9. The soot afterburner defined in claim 1, wherein the tube is formed in the upper portion at least partially of a soot-blocking and gas-passing filter material.

10. The soot afterburner defined in claim 1, wherein the exhaust tube has a portion in the upper housing portion that is removable and at least partially formed of a soot-blocking and gas-passing filter material.

* * * * *